June 3, 1924.
J. WHITE
CAMERA
Filed Dec. 18, 1920
1,496,503
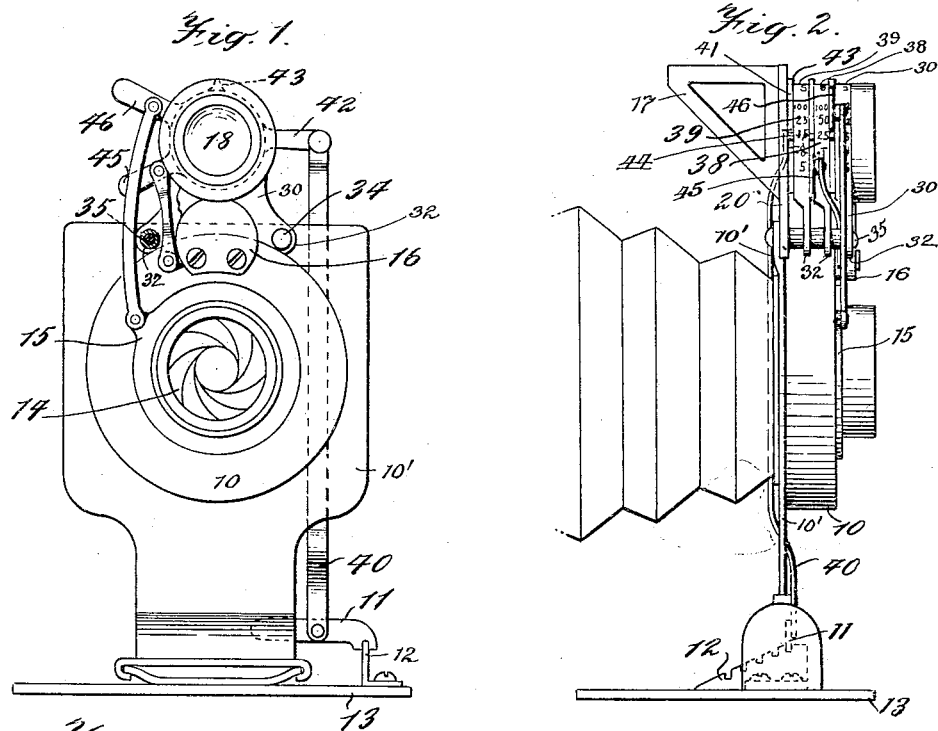
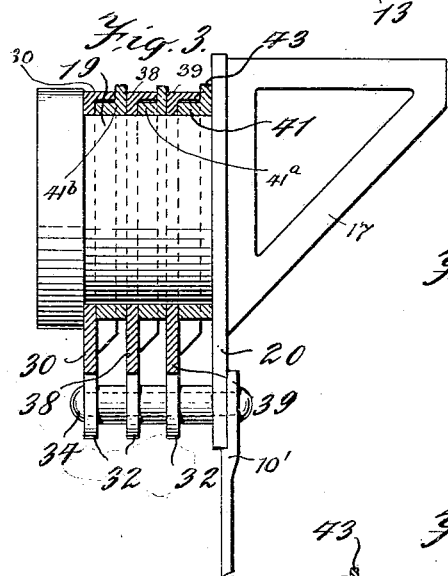
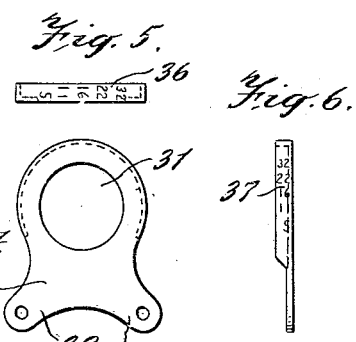
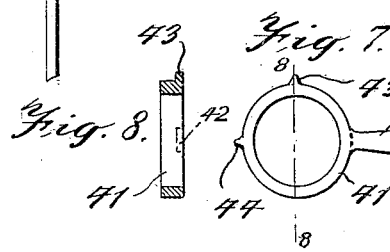
INVENTOR.
Joseph White, deceased
BY Minnie E. White, adm'x
ATTORNEYS Patented June 3, 1924.

1,496,503

UNITED STATES PATENT OFFICE.

JOSEPH WHITE, OF MIDDLESEX, NEW JERSEY; MINNIE E. WHITE ADMINISTRATRIX OF SAID JOSEPH WHITE, DECEASED.

CAMERA.

Application filed December 18, 1920. Serial No. 431,548.

*To all whom it may concern:*

Be it known that I, JOSEPH WHITE, a citizen of the United States, residing at Middlesex, in the county of Middlesex and State of New Jersey, have invented certain new and useful Improvements in Cameras, of which the following is a specification.

My present invention relates to the adjusting devices for cameras, particularly where the camera is adapted to take a photograph which is longer than it is wide.

As is well known, it is sometimes desirable to turn a camera on its side, as it were, so as to take a photograph which is high and narrow as compared with the usual photograph which is wider than it is high.

As is also well understood, most cameras are provided with focusing devices, shutter timing devices and aperture controlling devices, each of which is ordinarily adjusted by the user of the camera before taking a photograph.

It is also common to attach to said camera a finder in which the screen on which the image is projected is at right-angles to the optical axis of the finder, so that the image may be viewed by looking down on the screen. It is also customary to mount such a finder on the camera in such a manner that it may be rotated through 90°, so that, when the camera is turned on its side, the finder may also be rotated so as to bring its screen uppermost.

One of the objects of my invention is to provide indexing devices for one or more of the controlling devices of the camera, the scale marks on such indexing devices preferably being associated closely together, so that the operator may, by looking at substantially one place, observe the several sets before taking the photograph. Preferably, also, these scales and the marks thereon, together with the indicator devices connected to the several controlling devices, will be mounted, so that, when the camera is turned on its side, the several settings may be read from above with equal facility as when the camera is resting on its normal base.

With these and other objects in view, my invention consists in the constructions and arrangements hereinafter described and more specifically pointed out in the appended claims.

In the drawings, Figure 1 is a front elevation of an illustrative form of camera, to which my invention has been applied; Fig. 2 is a side elevation of Fig. 1; Fig. 3 is an enlarged view of the finder and scale members with parts broken away on the vertical axial plane of the finder; Figs. 4, 5 and 6 are three views of one of the scale members of the illustrative embodiment; Fig. 7 is a front elevation of one of the indicators of the illustrative embodiment; and Fig. 8 is a section on line 8—8 of Fig. 7.

Corresponding parts have corresponding reference characters in the several views.

In Figs. 1 and 2, the front portion of a well-known type of camera is illustrated, such a camera being provided, as is well understood, with a lens mounted in a frame connected to the plate holding devices by an expansible bellows. The lens holder 10 is moved out by hand until, in the form illustrated, a detent 11 engages with the proper notch in a gauge member 12 attached to the base 13 of the camera, to position the lens 10 for varying distances between the object to be photographed and the camera. Similarly, the camera is also provided with the well-known iris diaphragm 14 controlled by a rotatable member 15. The shutter is controlled by a timing device 16. Mounted on the lens supporting frame is a finder 17 of well-known form having a lens 18 in a tube 19 rotatably mounted in a frame 20 connected to a support 10' forming part of the lens carrier 10.

The devices so far described are of the usual type and further description thereof will, therefore, be unnecessary.

Preferably, I arrange the scales for the adjusting devices of the camera side by side, so that the operator may at a glance observe all of these settings. To this end, in the illustrative form, I have shown scale members surrounding the finder tube 19 as supports for such scales, the scales being provided for the diaphragm controlling device, the focusing controlling device and the shutter timing controlling device respectively. The scale members are substantial duplicates of the arrangement shown in Figs. 4, 5 and 6, and the description of one of them will be sufficient. In these figures, the diaphragm or stop scale member is illustrated as a sheet metal piece 30 having an opening 31 adapted to surround the tube 19, and a pair of projecting ears 32, 32 adapted to engage posts 34, 35 projecting out from the support 10' so as to hold the scale member 30 against rotation. The scale member is provided with an extended surface, on the top of which is a set of marks 36, and on the side of which is a set of marks 37, the sets of marks 36 and 37 being duplicates of each other. Similarly, a scale member 38 is provided for the time controlling device, and a scale member 39 for the focusing device. On the tube 19 is rotatably mounted an indicator for each of the controlling devices. Connected to the detent 11 of the focusing device through a connection 40 is an indicator 41 having a lever 42, to the end of which the connection 40 is pivotally attached. The indicator 41 has two pointers 43 and 44, each arranged to cooperate with one of the duplicate sets of markings on the scale member 39. Indicators 41$^a$ and 41$^b$ similar to 41, but with the levers thereof arranged in correct relation to cooperate with the devices to be controlled, are also mounted on the tube 19 each adjacent to one of the scale members 30 and 38, the levers for such controlling devices being indicated at 45 and 46.

In order that the focusing position of the camera lens in the holder 10 may be correctly indicated on the scale member 39, I form the notched member 12 in the manner shown in Fig. 2, so that the notches are progressively higher from rear to front. Therefore, as the lens is moved further from the photographic plate, the detent 11 will be raised higher and higher so as to move the pointers 43 and 44 around the scale member 39. In use, it will be understood that the camera will be focused, the opening of the diaphragm adjusted and the shutter set, all in the usual way, by the usual hand-operated levers. Since the indicators are connected to these levers, the pointers thereof will be moved on the corresponding scales to indicate the position of each device to which it has been adjusted. Since all of the scales are located side by side, the operator can see all of the scales at a glance and, in the illustrative embodiment, he sees them as he is looking into the finder. If any of the settings is not as it should be, the operator therefore has it called to his attention before the exposure is made. When the picture is to be taken with the camera in the position shown in the drawings, that is, resting on the base 13, the scale 36 on the member 30 and corresponding scales on members 38 and 39 with their respective pointers will be directly under the eye of the operator as he looks into the finder; when the camera is turned on its side, then the duplicate scale 37 on member 30 and corresponding scales on the sides of members 38 and 39 with their corresponding pointers, will be under the eye of the operator as he looks into the finder.

While I have shown my several scales surrounding the finder tube and the indicators rotatably mounted thereon, it will be obvious that such scales and indicators may be mounted in any other suitable manner, and that the mechanical constructions may be varied within wide limits.

I claim:—

1. In a camera having a plurality of controlling devices and a finder, a scale for each device, said scales being arranged side by side closely adjacent the finder and an indicator for each device and connected thereto and adapted to cooperate with the appropriate one of said scales.

2. In a camera having a plurality of controlling devices, a scale for each device, having the marks thereon duplicated in positions approximately 90 degrees apart, said scales being positioned side by side, and an indicator for each of the devices and connected thereto and adapted to cooperate with each of the sets of marks on the appropriate one of said scales.

3. In a camera having a plurality of controlling devices, a scale for each device having the marks thereon duplicated in positions approximately 90 degrees apart, said scales being positioned side by side, and an indicator for each of the devices having two pointers, each adapted to cooperate with one of the sets of marks on the appropriate one of said scales.

4. In a camera having a plurality of controlling devices, a scale for each device comprising a cylindrical member having the marks thereon duplicated on the convex surface of the cylinders in positions approximately 90 degrees apart, said cylindrical members being located side by side with their axes in alinement, an indicator for each of the devices and connected thereto and adapted to cooperate with each of the sets of marks on the appropriate one of said cylindrical members.

5. In a camera having a plurality of controlling devices, a scale for each device comprising a cylindrical member having the marks thereon duplicated on the convex surface of the cylinders in positions approximately 90 degrees apart, said cylindrical members being located side by side with their axes in alinement, an indicator for each of the devices and connected thereto and adapted to be rotated around the axes of said cylindrical members and to cooperate with both sets of marks on the appropriate one of said scales.

6. In a camera having a plurality of controlling devices, a scale for each device comprising a cylindrical member having the marks thereon duplicated on the convex surface of the cylinders in positions approximately 90 degrees apart, said cylindrical members being located side by side with their axes in alinement, an indicator to each of the devices and connected thereto and adapted to be rotated around the axes of said cylindrical members, each indicator having a pair of pointers, each adapted to cooperate with one of the sets of marks on the appropriate one of said scales.

7. In a camera having a plurality of controlling devices, a focusing tube adapted to be rotated, a plurality of cylindrical scale members mounted side by side around said tube and unconnected thereto, each of said members having the marks thereon duplicated on the convex surface thereof in positions approximately 90 degrees apart, means to hold said members in fixed relation to the camera, a plurality of indicators, each comprising a ring connected to one of the devices and rotatably mounted on said tube adjacent the appropriate scale member, each ring having a pair of pointers, each adapted to cooperate with one of the sets of marks on the appropriate scale member.

8. In a camera having a controlling device, a scale for the device having the marks thereon duplicated in positions approximately 90 degrees apart, and an indicator connected to the device and adapted to cooperate with each of the sets of marks.

9. In a camera having a controlling device, a scale for the device having the marks thereon duplicated in positions approximately 90 degrees apart, and an indicator connected to the device and having a pair of pointers, each adapted to cooperate with one of the sets of marks.

10. In a camera having a controlling device, a scale for the device comprising a cylindrical member having the marks thereon duplicated on the convex surface thereof in positions approximately 90 degrees apart, an indicator for the device and connected thereto and adapted to cooperate with each of the sets of marks.

11. In a camera having a controlling device, a scale for the device comprising a cylindrical member having the marks thereon duplicated on the convex surface thereof in positions approximately 90 degrees apart, an indicator for the device and connected thereto having a pair of pointers, each adapted to cooperate with one of the sets of marks.

12. In a camera having a controlling device, a focusing tube adapted to be rotated, a cylindrical scale member surrounding the same and unconnected thereto, said member having the marks thereon duplicated on the convex surface thereof in positions approximately 90 degrees apart, means to hold said member in fixed relation to the camera, and an indicator comprising a ring connected to the device and rotatably mounted on said tube adjacent said scale member, said ring having a pair of pointers, each adapted to cooperate with one of the sets of marks.

13. In a camera, a focus controlling and indicating device, comprising a scale, an indicator cooperating therewith, a detent connected to the camera and to the indicator, and a locating device attached to the camera and adapted to cooperate with the detent, said device being constructed and arranged to cause the detent to move the indicator as the detent is moved in changing the focus adjustment of the camera.

14. In a camera, a focus controlling and indicating device, comprising a scale, an indicator cooperating therewith, a detent connected to the lens carrier and adapted to be moved therewith longitudinally of the optical axis of the camera, said detent being also capable of motion at right-angles to said axis, connections between said detent and said indicator, and means on the camera adapted to cooperate with said detent to lock the lens carrier in adjusted position and to move said detent at right-angles to said axis in accordance with the positions of the lens carrier.

15. In a camera, a focus controlling and indicating device, composing a scale, an indicator cooperating therewith, a detent on the lens carrier and adapted to be moved at right-angles to the optical axis of the camera, and a detent engaging member on the camera provided with notches to engage said detent to hold the lens in adjusted position, said member being constructed and arranged to hold the detent in a different position in a plane at right-angles to said axis for each notch in said member.

JOSEPH WHITE.